United States Patent
Levanoni et al.

(10) Patent No.: US 8,094,793 B1
(45) Date of Patent: Jan. 10, 2012

(54) BILLING CYCLE DIVISION SYSTEM, METHOD, AND COMPUTER PROGRAM PRODUCT

(75) Inventors: Yishai Levanoni, Or-Yehuda (IL); Doron Shalit, Givaataim (IL)

(73) Assignee: Amdocs Software Systems Limited, Dublin (IE)

( * ) Notice: Subject to any disclaimer, the term of this patent is extended or adjusted under 35 U.S.C. 154(b) by 322 days.

(21) Appl. No.: 11/106,304

(22) Filed: Apr. 13, 2005

Related U.S. Application Data

(60) Provisional application No. 60/656,746, filed on Feb. 25, 2005.

(51) Int. Cl.
*H04M 11/00* (2006.01)
*H04M 15/00* (2006.01)
*G07B 17/00* (2006.01)
*G07F 19/00* (2006.01)
*G06Q 40/00* (2006.01)
*G06F 17/00* (2006.01)

(52) U.S. Cl. ............. 379/100.03; 379/114.03; 379/116; 705/30; 705/40; 705/400

(58) Field of Classification Search ............. 379/100.03, 379/114.03, 116; 705/1, 30, 34.1, 40, 400, 705/418
See application file for complete search history.

(56) References Cited

U.S. PATENT DOCUMENTS

| | | | | |
|---|---|---|---|---|
| 5,852,812 | A * | 12/1998 | Reeder | 705/39 |
| 6,119,109 | A * | 9/2000 | Muratani et al. | 705/400 |
| 6,401,098 | B1 * | 6/2002 | Moulin | 707/102 |
| 6,493,680 | B2 * | 12/2002 | Logan et al. | 705/34 |
| 6,708,226 | B2 * | 3/2004 | Peters et al. | 705/34 |
| 7,236,950 | B2 * | 6/2007 | Savage et al. | 705/34 |
| 2002/0087342 | A1 * | 7/2002 | Garvey | 705/1 |
| 2003/0069974 | A1 * | 4/2003 | Lu et al. | 709/226 |
| 2003/0158812 | A1 * | 8/2003 | Engelhart | 705/39 |
| 2005/0111643 | A1 * | 5/2005 | Huang | 379/121.01 |

* cited by examiner

*Primary Examiner* — Ahmad Matar
*Assistant Examiner* — Nafiz E Hoque
(74) *Attorney, Agent, or Firm* — Zilka Kotab, PC

(57) ABSTRACT

A system, method and computer program product are provided for distributed billing. In use, service usage information associated with a plurality of customers is distributed to a plurality of billing processor platforms in substantially a billing cycle-independent manner, for processing purposes. To this end, less billing processor platform resources are wasted.

15 Claims, 3 Drawing Sheets

BILLING CYCLE DIVISION SYSTEM, METHOD, AND COMPUTER PROGRAM PRODUCT

RELATED APPLICATION(S)

The present application claims priority from a provisional application filed Feb. 25, 2005 under application Ser. No. 60/656,746, which is incorporated herein by reference in its entirety.

FIELD OF THE INVENTION

The present invention relates to billing systems, and more particularly, to managing billing cycles.

BACKGROUND OF THE INVENTION

Typically, service providers have a large number of customers which need to be billed regularly based on their usage of services. Such services can include, but are not limited to telecommunications service providers, television service providers, power suppliers, water suppliers, application service providers, software services, etc. The billing process involves retrieving data relating to usage of the services of each customer, combining this with existing information stored relating to each customer, such as contact details and customer account balances, and supplying this information to billing systems which process the information to generate invoices, statements and the like.

The billing process typically relates to usage during a particular billing period which is a length of time determined by the service provider. Typically, the billing period is either 4 weeks or one calendar month as this is a suitable length of time which enables billing to be done in a regular manner without being too often so as to be an inconvenience to either the service provider or the customers.

As the utilities usually have a large customer base, the customer billing process requires a large amount of computer, monetary and human resources. As a result, a number of techniques are implemented during bill generation to streamline the process. For example, a plurality of groups of customers is often each allocated to one of a number of billing cycles. A billing cycle relates to a billing period, such as a 4 week period, and each billing cycle is staggered so as to fall at a different time from the other billing cycles.

For example, a first billing cycle might run from Sep. 1, 2005 to Sep. 30, 2005, then from Oct. 1, 2005 to Oct. 31, 2005, then from Nov. 1, 2004 to Nov. 30, 2004, and so on. A second billing cycle may fall on different dates. For example, the second bill cycle might run from Sep. 2, 2005 to Oct. 1, 2005, then from Oct. 2, 2005 to Nov. 1, 2005, then from Nov. 2, 2005 to Dec. 1, 2005, and so on. As many different staggered billing cycles as necessary can be used.

A billing process typically occurs on or shortly after the completion of the current billing cycle. For example, for the first billing cycle, a billing cycle run might be initiated on Sep. 29, 2004, the next on Oct. 29, 2004, the next on Nov. 29, 2004, and so on, with the resulting invoices or statements being sent to customers once the respective billing cycle run is completed. In this manner, the processing of customer records is staggered such that only a subset of all customers are processed and billed at a particular time, rather than the entire customer base.

As a further efficiency measure, a typical billing system may implement multiple billing processors which operate in parallel. During a billing cycle run, service usage information of customers relating to the particular billing period are distributed between a number of billing processor platforms. In this manner, a number of customer accounts are processed simultaneously (i.e. account of customer group A on billing processor platform X, account of customer group B on billing processor platform Y, etc.), thus speeding up the billing cycle run. Often, each customer has an associated billing cycle identifier associated therewith to facilitate the foregoing allocation.

It is important to note that there are traditionally two types of processing: ongoing processing of usage events, which occurs all the time; and end of cycle processing, which occurs once a cycle for each cycle. Such end of cycle processing is typically most efficient when performed on the relevant usage machine, where it may use a local database for faster performance.

In order to ensure that each billing processor platform can handle cycles where each customer in a particular group exhibits heavy usage, as well as end of cycle processing (which is typically heavy), a predetermined number of processors (i.e. CPU's, etc.) are included in each billing processor platform. To this end, each billing processor platform is capable of handling a "worst case scenario," in terms of an amount of processing required for a particularly heavy billing cycle.

One inherent problem with this type of architecture is that, inevitably, some of the processors of the billing processor platforms will, from one billing cycle to another, have unused resources. This is problematic, since processing resources are very expensive.

There is thus a need for overcoming these and/or other problems associated with the prior art.

SUMMARY

A system, method and computer program product are provided for distributed billing. In use, service usage information associated with a plurality of customers is distributed to a plurality of billing processor platforms in substantially a billing cycle-independent manner, for processing purposes. To this end, less billing processor platform resources are wasted.

DETAILED DESCRIPTION

Figure 1:
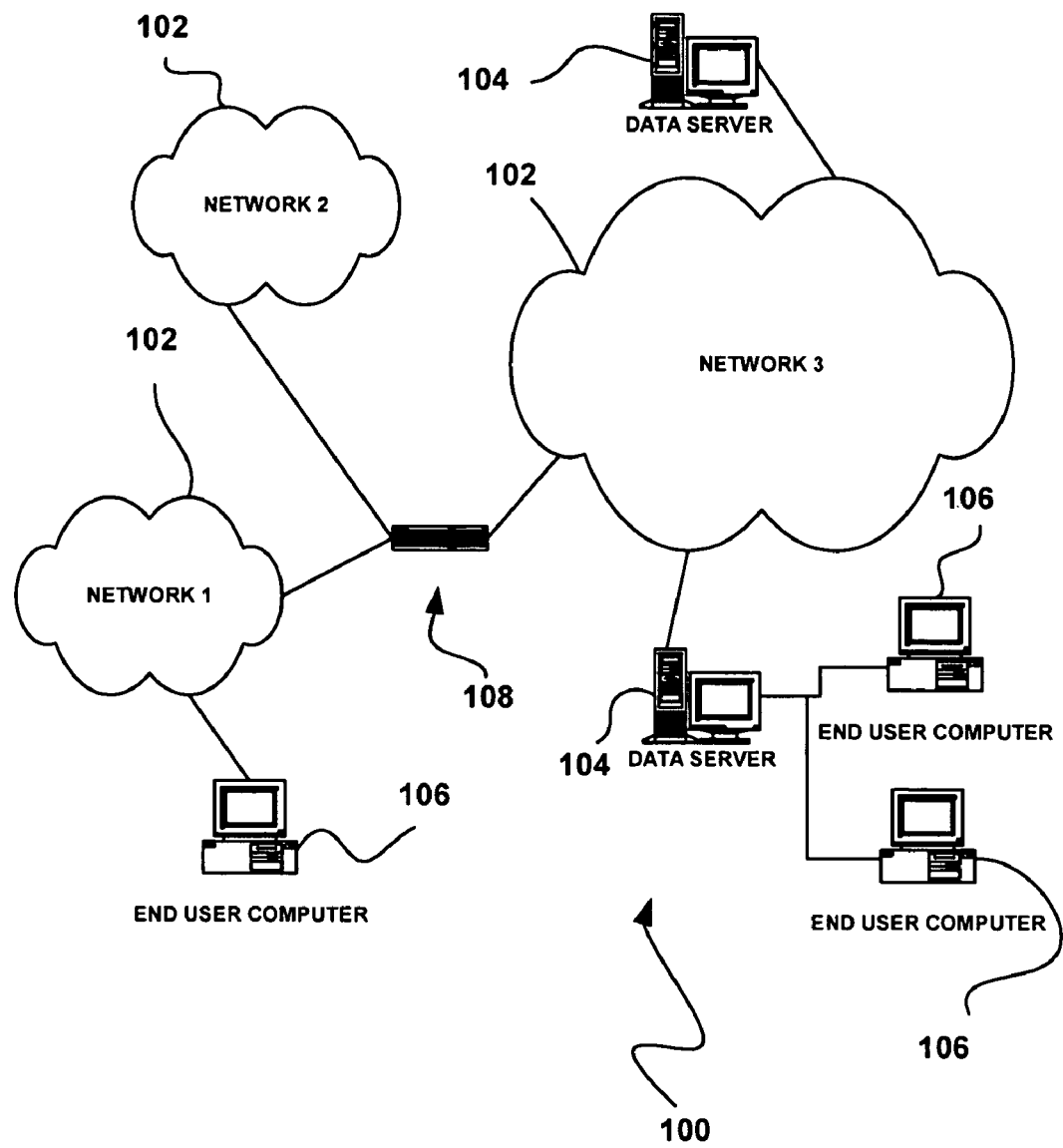
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various billing features. For example, the various data server computers 104 and/or end user computers 106 may be equipped with a billing system, for reasons that will soon become apparent.

Figure 2:
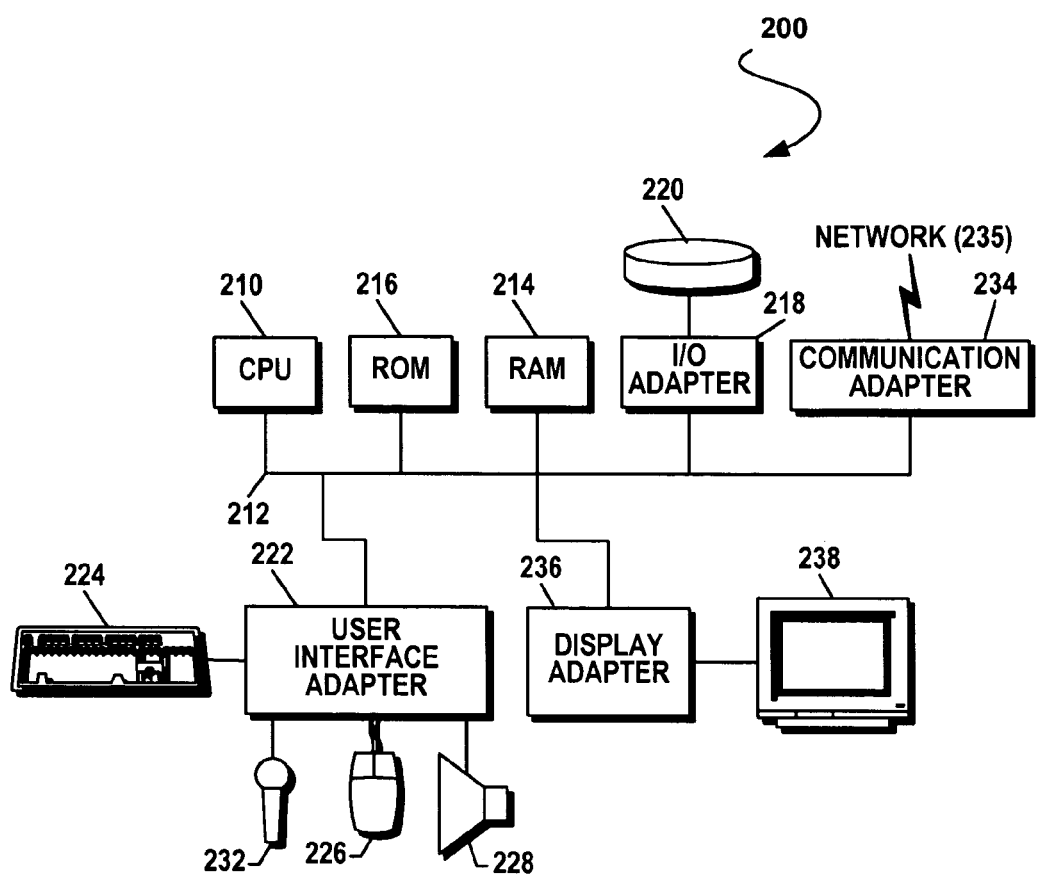
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, a communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
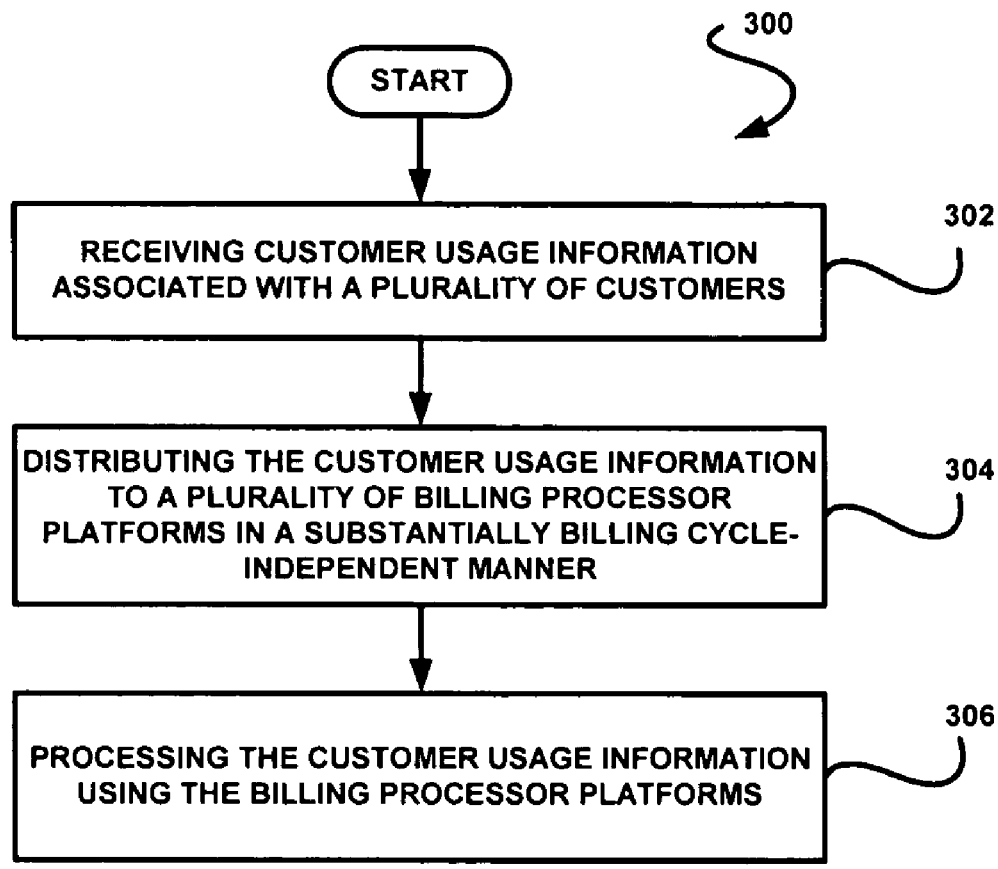
FIG. 3 shows a billing method, in accordance with one embodiment.

FIG. 3 shows a distributed billing method 300, in accordance with one embodiment. As an option, the billing method 300 may be implemented in the context of the architecture and environment of FIGS. 1 and/or 2. Of course, however, the billing method 300 may be carried out in any desired environment.

Initially, in operation 302, service usage information associated with a plurality of customers is received. Such usage information may include time-based data, content-based data, and/or any data that facilitates billing for a service. Of course, the service may include anything that is paid for by a customer.

Next, in operation 304, the service usage information is distributed to a plurality of billing processor platforms for being processed by the billing processor platforms, for processing the service usage information. See operation 306. Such processing by the billing processor platforms may be accomplished in parallel.

In one embodiment, each billing processor platform may include at least one processor (e.g. see central processing unit 210 of FIG. 2, for example). Of course, any type of processor may be utilized. Still yet, the billing processor platforms may be distributed among a plurality of networked computers (see server computers 104 and/or end user computers 106 of FIG. 1, for example). Of course, the billing processor platforms may or many not be distributed. Further, the billing processor platforms may be implemented as a single unit.

In use, the aforementioned distribution is accomplished in a substantially billing cycle-independent manner. In other words, the service usage information is distributed in a manner that is at least partially independent of a billing cycle.

Such billing cycle-independent distribution may, in one embodiment, be accomplished by associating a rating partition identifier (instead and/or independent of a billing cycle identifier of the prior art) with each customer. Any service usage information may receive an associated relevant rating partition identifier from the customer to which it is associated. To this end, a billing cycle does not necessarily determine the billing processor platform where the customer-related data is stored and processed. More optional details associated with such identifier will be set forth hereinafter in greater detail. Of course, any billing cycle-independent distribution may be utilized to ensure that less billing processor platform resources are wasted [i.e. less processors (CPU's), etc. are required, etc.].

By this feature, the service usage information may be distributed to the different billing processor platforms without necessary regard to any sort of specific allocation to each of the billing processor platforms. By doing this, the billing processor platforms simultaneously handle processing for a mix of customers and a mix of different cycles.

In one embodiment, the service usage information may be stored in a local database, associated with a particular billing processor platform. In the alternative, a centralized database may be used to store the customer usage information. In such embodiment, the billing processor platforms each receive the appropriated customer usage information from the centralized database.

In one embodiment, a customer population may be partitioned into different billing cycles, and billing processing may be performed in the context of a billing cycle. Further, billing processing may involve several manipulations of the service usage data associated with the customers of a specific billing cycle. Since the customers of a billing cycle are distributed in a billing cycle-independent manner, the distribution of billing processing activities may be permitted.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

As mentioned earlier, a billing cycle-independent distribution may, in one embodiment, be accomplished by associating a rating partition identifier with each customer and/or service usage information. This allocation may be carried out in a variety of ways. Table 1 illustrates two exemplary allocation techniques.

TABLE 1

| | |
|---|---|
| Load Balancing - | An allocation algorithm that maintains balanced partitions in terms of a number of customers and maintains an even distribution of each cycle among the partitions |
| Cycle Compatibility Mode - | Maintains compatibility with prior art functionality, where all customers of a cycle reside in a single partition |

As an option, an application program interface may be included for moving a customer between partitions. This may be beneficial when migrating a customer from a postpaid system to a prepaid system, etc.

Thus, each customer may have a rating partition identifier, which may be used to determine the billing processor platform where such customer is handled. The rating partition identifier may be used to replace a customer's billing cycle in determining the billing processor platform that processes service usage information for the given customer. Such separation of the billing cycle from rating partition enables distributed cycle deployments of an event processing system, where customers with the same billing cycle may be spread across multiple billing processor platforms.

Distribution of end of cycle activities (i.e. rerating by applying a different rate of charge, extraction of data for various end of cycle processing/analysis, etc.) may further be distributed across multiple billing processor platforms. This may reduce hardware requirements, since, in the prior art, billing processor platforms often required spare resources for handling end of cycle activities, since such activities could not be distributed over multiple billing processor platforms.

It should be noted that a rating partition identifier-based deployment does not preclude and may be used to provide a traditional deployment, where all customers belonging to a cycle reside together.

Additional illustrative information regarding various optional architectures and features with which the foregoing systems and methods may or may not be implemented may be found in Appendix A of a provisional application filed Feb. 25, 2005 under application Ser. No. 60/656,746, which is incorporated herein by reference in its entirety. It should be strongly noted that the information in Appendix A is set forth for illustrative purposes and should not be construed as limiting in any manner.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A billing method, comprising:
receiving customer usage information; and
distributing service usage information associated with a plurality of customers to a plurality of billing processor platforms in substantially a billing cycle-independent manner, for being processed by the billing processor platforms;
wherein the distribution allows distribution of end of cycle activities;
wherein each of the billing processor platforms simultaneously handles processing for a plurality of different customers and a plurality of different billing cycles;
wherein a rating partition identifier is associated with each of the customers, the rating partition identifier utilized for determining which one of the plurality of billing processor platforms handles the service usage information associated with each of the customers, wherein for each of the customers the rating partition identifier is used to replace a billing cycle of the customer in determining the one of the plurality of billing processor platforms that processes service usage information for the customer such that separation of the billing cycle of the customer from the rating partition enables distributed cycle deployments of an event processing system, where the customers with a same billing cycle are spread across the plurality of billing processor platforms;
wherein the service usage information is stored in a central database shared among the billing processor platforms;
wherein the end of cycle activities include processing performed only once during each of the billing cycles at an end of each of the billing cycles, and the distribution of the end of cycle activities includes distributing the end of cycle activities across multiple of the billing processor platforms, such that hardware requirements are reduced by preventing each of the billing processor platforms from requiring spare resources for handling the end of cycle activities as a result of the end of cycle activities not being distributed over the multiple billing processor platforms;
wherein the plurality of customers are partitioned;
wherein load balancing is performed by maintaining a balanced number of customers in each of a plurality of partitions;
wherein an application program interface is utilized for moving at least one of the customers from a first one of the plurality of partitions to a second one of the plurality of partitions.

2. The billing method of claim 1, wherein the processing by the billing processor platforms is carried out in parallel.

3. The billing method of claim 1, wherein the billing processor platforms are distributed among a network.

4. The billing method of claim 1, wherein the billing processor platforms are contained in a single unit.

5. The billing method of claim 1, wherein the service usage information is distributed in a manner that is at least partially independent of a billing cycle.

6. The billing method of claim 1, wherein the service usage information is associated with a plurality of customers.

7. The billing method of claim 1, wherein the billing processor platforms retrieve the service usage information via a network.

8. The billing method of claim 1, wherein the end of cycle activities include extracts.

9. The billing method of claim 1, wherein the end of cycle activities include rerate operations.

10. The billing method of claim 1, wherein the distribution ensures that less billing processor platform resources are wasted.

11. A non-transitory computer storage medium for storing a billing computer program, comprising:
computer code for receiving customer usage information; and
computer code for distributing service usage information associated with a plurality of customers to a plurality of billing processor platforms in substantially a billing cycle-independent manner, for being processed by the billing processor platforms;
wherein the billing computer program is operable such that the distribution allows distribution of end of cycle activities;
wherein each of the billing processor platforms simultaneously handles processing for a plurality of different customers and a plurality of different billing cycles;
wherein a rating partition identifier is associated with each of the customers, the rating partition identifier utilized for determining which one of the plurality of billing processor platforms handles the service usage information associated with each of the customers, wherein for each of the customers the rating partition identifier is used to replace a billing cycle of the customer in determining the one of the plurality of billing processor platforms that processes service usage information for the customer such that separation of the billing cycle of the customer from the rating partition enables distributed cycle deployments of an event processing system, where the customers with a same billing cycle are spread across the plurality of billing processor platforms;

wherein the service usage information is stored in a central database shared among the billing processor platforms;

wherein the end of cycle activities include processing performed only once during each of the billing cycles at an end of each of the billing cycles, and the distribution of the end of cycle activities includes distributing the end of cycle activities across multiple of the billing processor platforms, such that hardware requirements are reduced by preventing each of the billing processor platforms from requiring spare resources for handling the end of cycle activities as a result of the end of cycle activities not being distributed over the multiple billing processor platforms;

wherein the billing computer program is operable such that the plurality of customers are partitioned;

wherein the billing computer program is operable such that load balancing is performed by maintaining a balanced number of customers in each of a plurality of partitions;

wherein the billing computer program is operable such that an application program interface is utilized for moving at least one of the customers from a first one of the plurality of partitions to a second one of the plurality of partitions.

12. A billing system, comprising:

a processor for receiving customer usage information;

wherein the processor distributes service usage information associated with a plurality of customers to a plurality of billing processor platforms in substantially a billing cycle-independent manner, for being processed by the billing processor platforms;

wherein the billing system is operable such that the distribution allows distribution of end of cycle activities;

wherein each of the billing processor platforms simultaneously handles processing for a plurality of different customers and a plurality of different billing cycles;

wherein a rating partition identifier is associated with each of the customers, the rating partition identifier utilized for determining which one of the plurality of billing processor platforms handles the service usage information associated with each of the customers, wherein for each of the customers the rating partition identifier is used to replace a billing cycle of the customer in determining the one of the plurality of billing processor platforms that processes service usage information for the customer such that separation of the billing cycle of the customer from the rating partition enables distributed cycle deployments of an event processing system, where the customers with a same billing cycle are spread across the plurality of billing processor platforms;

wherein the service usage information is stored in a central database shared among the billing processor platforms;

wherein the end of cycle activities include processing performed only once during each of the billing cycles at an end of each of the billing cycles, and the distribution of the end of cycle activities includes distributing the end of cycle activities across multiple of the billing processor platforms, such that hardware requirements are reduced by preventing each of the billing processor platforms from requiring spare resources for handling the end of cycle activities as a result of the end of cycle activities not being distributed over the multiple billing processor platforms;

wherein the billing system is operable such that the plurality of customers are partitioned;

wherein the billing system is operable such that load balancing is performed by maintaining a balanced number of customers in each of a plurality of partitions;

wherein the billing system is operable such that an application program interface is utilized for moving at least one of the customers from a first one of the plurality of partitions to a second one of the plurality of partitions.

13. The billing method of claim 1, wherein the plurality of customers are partitioned into the plurality of different billing cycles.

14. The billing method of claim 1, wherein the application program interface is utilized for moving the at least one of the customers from the first one of the plurality of partitions to the second one of the plurality of partitions, for use in migrating the at least one of the customers from a post paid system to a prepaid system.

15. The method of claim 1, wherein the billing processing platforms each receive the customer usage information from the central database.

* * * * *